(No Model.)
O. BOITEAU.
HOOK.
No. 466,766.        Patented Jan. 12, 1892.
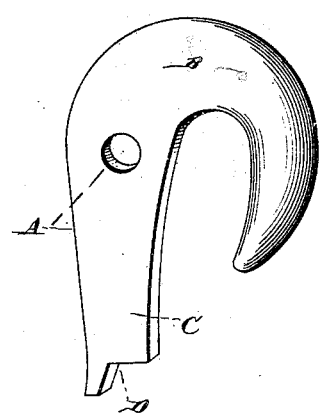
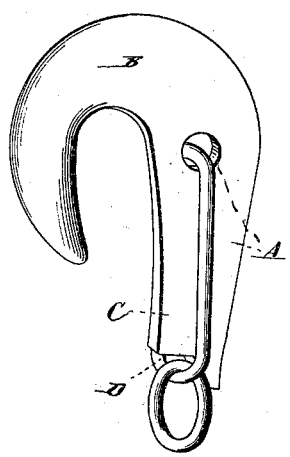
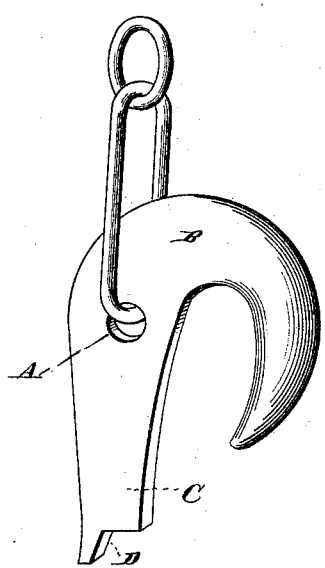
Witnesses:
A. Boucher
Inventor:
Octave Boiteau
per Joseph J. Frontier
Attorney

UNITED STATES PATENT OFFICE.

OCTAVE BOITEAU, OF EAGLETON, WISCONSIN.

HOOK.

SPECIFICATION forming part of Letters Patent No. 466,766, dated January 12, 1892.

Application filed July 3, 1891. Serial No. 398,424. (No model.)

*To all whom it may concern:*

Be it known that I, OCTAVE BOITEAU, a citizen of the United States, and a resident of Eagleton, county of Chippewa, and State of Wisconsin, have invented a certain new and useful Hook, of which the following is a specification.

The object of my invention is to avoid the unnecessary labor, delays, and accidents occasioned by hooks fastening on roots, trees, brush, or any other obstruction, as is liable to occur and often happens with all hooks fastened on chains when they drag on the ground in logging, or in using such hooks and chains in any other operations whatever. I obtain this object by a peculiar construction of the hook and a peculiar way of fastening said hook to the chain so that it is made reversible and will act as a hook only when fastened and on a tension, it reversing at once when loosened and dragging or disengaging from the end of the chain.

The accompanying drawings will illustrate the same.

Figure I is the hook as constructed ready to fasten to the chain. A is the hole to fasten the hook to the chain. B is the head or hooking portion of the hook. C is the tail of the hook. D is a recess that admits the anterior portion of the hook to fit inside of the first link, causing the hook to fit snugly to and parallelize with the chain.

Fig. II is the hook in position and tension when used as a hook.

Fig. III is the hook as disengaged and reversed.

In carrying out my invention the hole A, proximal point of traction, is placed in the head of the hook on a level with the apex of the inside curve of the hook, (distal point of traction,) and deviating from the straight line with that point for an inch or more, according to the size of the hook, on its posterior portion, so that when traction is made, the hook being in position, the effect is to move the tail C against the chain, its anterior portion entering within the first link as far as the recess and prolongation, which recess and prolongation prevent its further progress, and thus parallelize the hook with the chain and make it effective as a hook, while if disengaged and allowed its own gravitation and resistance it will readily reverse, and in that position will be entirely inoperative as a hook and utterly incapable of catching on roots or other obstructions, as shown in Fig. III. To cause its reversion, the tail C is made heavier than the head B, which it overbalances thereby, and consequently will gravitate or resist in accordance with its overweight, in precedence to the head. The head B is made of a convenient size to go and play easily through the first link, and thereby enhances its easy and complete reversion. The tail C is also made of convenient size to slip through the first link of the chain and to fit snugly into it, as in Fig. II, and it is provided with a recess and prolongation at its lower end, which extends beyond the proximal end of the first link and rests against it, and thus prevents the tail of the hook to slip clear through the link and preserves its parallelism with the chain and causes the hook to be operative as a hook when thus in tension, the two points of opposite traction, the inside of the hook and the chain at A, being in operation.

Having thus described my invention, what I claim as new, and desire to secure by Letters Patent, is—

A hook provided with an aperture A in the hook portion B, a chain-link pivotally connected therein, the shank portion of the hook having a shoulder or seat D for the link and a projecting stop therefor, the shank portion being heavier than the hook portion, substantially as described.

OCTAVE BOITEAU.

Witnesses:
W. H. STAFFORD,
JEAN FORTIER.